United States Patent
Zhang et al.

(10) Patent No.: US 12,124,636 B2
(45) Date of Patent: Oct. 22, 2024

(54) KEYBOARD

(71) Applicant: BOE TECHNOLOGY GROUP CO., LTD., Beijing (CN)

(72) Inventors: Yangyang Zhang, Beijing (CN); Lirong Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/914,339

(22) PCT Filed: Oct. 28, 2021

(86) PCT No.: PCT/CN2021/126968
§ 371 (c)(1),
(2) Date: Sep. 24, 2022

(87) PCT Pub. No.: WO2022/188429
PCT Pub. Date: Sep. 15, 2022

(65) Prior Publication Data
US 2023/0111769 A1    Apr. 13, 2023

(30) Foreign Application Priority Data
Mar. 11, 2021 (CN) .......................... 202110266374.8

(51) Int. Cl.
*G06F 3/02* (2006.01)
*G06F 3/042* (2006.01)
(Continued)

(52) U.S. Cl.
CPC ............ *G06F 3/021* (2013.01); *G06F 3/0426* (2013.01); *H01H 13/14* (2013.01); *H01H 13/70* (2013.01)

(58) Field of Classification Search
CPC .... G06F 3/0236; G06F 3/0202; G06F 3/0426; G06F 3/0227; G06F 3/021; G06F 3/0221;
(Continued)

(56) References Cited

U.S. PATENT DOCUMENTS 6,773,179 B2 * 8/2004 Huang .................. G06F 3/0221
400/489
7,503,713 B2 * 3/2009 Large ...................... G06F 3/023
400/489
(Continued)

FOREIGN PATENT DOCUMENTS

CN    202721714 U    2/2013
CN    103324298 A    9/2013
(Continued)

OTHER PUBLICATIONS

China Patent Office, First Office Action, May 16, 2024, Appl'n No. CN202110266374.8.

*Primary Examiner* — Olga V Merkoulova
(74) *Attorney, Agent, or Firm* — HOUTTEMAN LAW LLC

(57) ABSTRACT

The present disclosure provides a keyboard, including: a keyboard body; at least one physical key disposed on the keyboard body; at least one virtual key projection device connected to the keyboard body and configured to present, by means of projection, an image of at least one virtual key in a projection area outside the keyboard body; and a click detection device configured to detect whether a finger clicks on the projection area and determine on which virtual key the finger clicks in response to that the finger clicks on the projection area.

17 Claims, 8 Drawing Sheets

(51) Int. Cl.
*H01H 13/14* (2006.01)
*H01H 13/70* (2006.01)

(58) Field of Classification Search
CPC ........... G06F 3/042; G06F 3/02; H01H 13/70; H01H 13/14
See application file for complete search history.

(56) References Cited

U.S. PATENT DOCUMENTS

| | | | | |
|---|---|---|---|---|
| 8,300,023 | B2* | 10/2012 | Forutanpour | G06F 21/36 345/173 |
| 8,908,362 | B2* | 12/2014 | Wang | G06F 3/0221 200/341 |
| 9,411,381 | B2* | 8/2016 | Lee | G06F 1/1698 |
| 9,548,012 | B1* | 1/2017 | Sjoberg | G06F 3/0425 |
| 10,120,418 | B2* | 11/2018 | Lee | G06F 1/1666 |
| 10,249,457 | B2* | 4/2019 | Norwalk | G06F 3/0221 |
| 10,365,723 | B2* | 7/2019 | Yao | H05B 47/11 |
| 10,649,653 | B2* | 5/2020 | Creager | G06F 21/316 |
| 2009/0316954 | A1* | 12/2009 | Kohara | G06F 3/0426 358/1.15 |
| 2014/0055936 | A1* | 2/2014 | Wang | G06F 3/0221 361/679.15 |
| 2014/0168083 | A1 | 6/2014 | Ellard | |
| 2014/0240235 | A1* | 8/2014 | Norwalk | G06F 3/0202 345/168 |
| 2016/0370927 | A1* | 12/2016 | Fang | G06F 1/1616 |
| 2017/0207041 | A1* | 7/2017 | Norwalk | G06F 3/0216 |
| 2017/0315623 | A1* | 11/2017 | Yao | G06F 3/021 |

FOREIGN PATENT DOCUMENTS

| | | |
|---|---|---|
| CN | 108153428 A | 6/2018 |
| CN | 211087048 U | 7/2020 |
| CN | 111796689 A | 10/2020 |

* cited by examiner first state second state

KEYBOARD

TECHNICAL FIELD

The present disclosure relates to a keyboard.

BACKGROUND

A keyboard is a command/data input device configured to control a device to operate, and also refers to a set of function keys (e.g., a typewriter, or a computer keyboard) configured to operate a machine or a device under the control of a system. At present, the keyboards on the market are generally large in size and inconvenient to carry.

In order to reduce sizes of the keyboards, some manufacturers have produced "functional keypads", such as an office keypad (having 69 to 88 keys in general) including English letter keys on the left side of a standard keyboard (having 104 keys), numbers keys, and keys F1 to F12, and a numeric keypad including number keys and operation keys on the right side of the standard keyboard. Although those "functional keypads" can reduce the sizes of the keyboards to a certain extent, some input functions are lost to a certain extent.

SUMMARY

In order to solve at least one of the technical problems in the prior art, the present disclosure provides a keyboard.

In a first aspect, an embodiment of the present disclosure provides a keyboard, including: a keyboard body; at least one physical key on the keyboard body; at least one virtual key projection device connected to the keyboard body and configured to present, by means of projection, an image of at least one virtual key in a projection area outside the keyboard body; and a click detection device configured to detect whether a finger clicks on the projection area and determine on which virtual key the finger clicks in response to that the finger clicks on the projection area.

In some embodiments, the keyboard is a deformable keyboard.

In some embodiments, the keyboard further includes at least one supporting connector, with one end of the supporting connector connected to the keyboard body, and the other end of the supporting connector connected to the at least one virtual key projection device.

In some embodiments, the keyboard body is provided with an accommodating groove corresponding to the supporting connector, and the supporting connector is capable of being placed inside the accommodating groove and moved out of the accommodating groove.

In some embodiments, a first rotating shaft is in the accommodating groove, with one end of the supporting connector connected to the first rotating shaft and capable of rotating around the first rotating shaft.

In some embodiments, the accommodating groove is provided therein with a slide rail, and the supporting connector is connected to the slide rail and is capable of moving along the slide rail to slide out of or retract into the accommodating groove.

In some embodiments, one end of the supporting connector is connected to an edge region of the keyboard body, and the edge region comprises: a peripheral region, of a surface on which the physical key is disposed, of the keyboard body and a side surface of the keyboard body.

In some embodiments, the virtual key includes at least one of keys F1, F2, F3, F4, F5, F6, F7, F8, F9, F10, F11, and F12.

In some embodiments, the keyboard body includes a rotating connection portion; and at least one rotating portion, wherein each of the at least one rotating portion is connected to the rotating connection portion through a corresponding second rotating shaft and rotates around the corresponding second rotating shaft to realize folding and deformation of the keyboard; wherein the physical key and the click detection device are on the rotating portion.

In some embodiments, the at least one rotating portion includes two rotating portions, and each of the two rotating portions is in a shape of strip, and the keyboard body is configured to be switched between a first state and a second state; the keyboard body is in the first state, center lines of two strip-shaped rotating portions are arranged in parallel and are not collinear; and the keyboard body is in the second state, the center lines of the two strip-shaped rotating portions are in a same straight line.

In some embodiments, the keyboard body further includes a carrier portion, wherein one end of the carrier portion is fixedly connected to the rotating connection portion, and the virtual key projection device is disposed on the carrier portion.

In some embodiments, the at least one rotating portions includes two rotating portions, each of the two rotating portions is in a shape of strip, and the carrier portion is in a shape of strip. The keyboard body is configured to be switched between a first state and a second state. The keyboard body is in the first state, center lines of two strip-shaped rotating portions are in parallel and are not collinear, and a center line of the carrier portion and the center lines of the rotating portions are in parallel and are not collinear. the keyboard body is in the second state, the center lines of the two strip-shaped rotating portions are in a same straight line, and the center line of the carrier portion is perpendicular to the center lines of the rotating portions.

In some embodiments, the physical key includes at least one of keys F1, F2, F3, F4, F5, F6, F7, F8, F9, F10, F11, and F12.

In some embodiments, the virtual key projection device includes a light source; an image mask on a light-emitting side of the light source; the image mask has a light-transmitting region matched with the virtual key to be presented and a light-shielding region in addition to the light-transmitting region; or the image mask has a light-shielding region matched with the virtual key to be presented and a light-transmitting region in addition to the light-shielding region.

In some embodiments, the light-transmitting region of the image mask is a light-transmitting region having an adjustable shape and/or an adjustable size.

In some embodiments, the image mask includes: a liquid crystal panel.

In some embodiments, the virtual key projection device further includes a collimator between the light source and the image mask or on a side of the image mask away from the light source and configured to collimate light.

In some embodiments, the virtual key projection device includes a laser projection device, a liquid crystal on silicon projection device, or a digital mirror projection device.

In some embodiments, the virtual key projection device includes a switch unit configured to control on and off of the virtual key projection device.

In some embodiments, the click detection device includes an image acquisition unit configured to continuously acquire images of the projection area, so that a processor identifies the virtual key on which the finger clicks according to the images of the projection area acquired by the image acquisition unit.

In some embodiments, two image acquisition unit are provided. The two image acquisition units are respectively located at different positions on the keyboard body.

In some embodiments, the click detection device includes a positioning unit configured to acquire a click position of the finger in the projection area, so that a processor determines the virtual key on which the finger clicks according to the click position and a projected position of each virtual key.

In some embodiments, the keyboard further includes a prompting device on the keyboard body and configured to inform a user of a successful click with a preset prompting method in response to the click detection device detects that the finger clicks on the virtual key.

In some embodiments, the preset prompting method includes one or more of sending out a sound prompt, emitting a flicker prompt, increasing display brightness of the clicked virtual key, reducing brightness of other virtual keys adjacent to the clicked virtual key, and sending out a vibration prompt.

DETAIL DESCRIPTION OF EMBODIMENTS

In order to enable those of ordinary skill in the art to better understand the technical solutions of the present disclosure, a keyboard provided by the present disclosure will be described in detail below with reference to the drawings.

Figure 1:
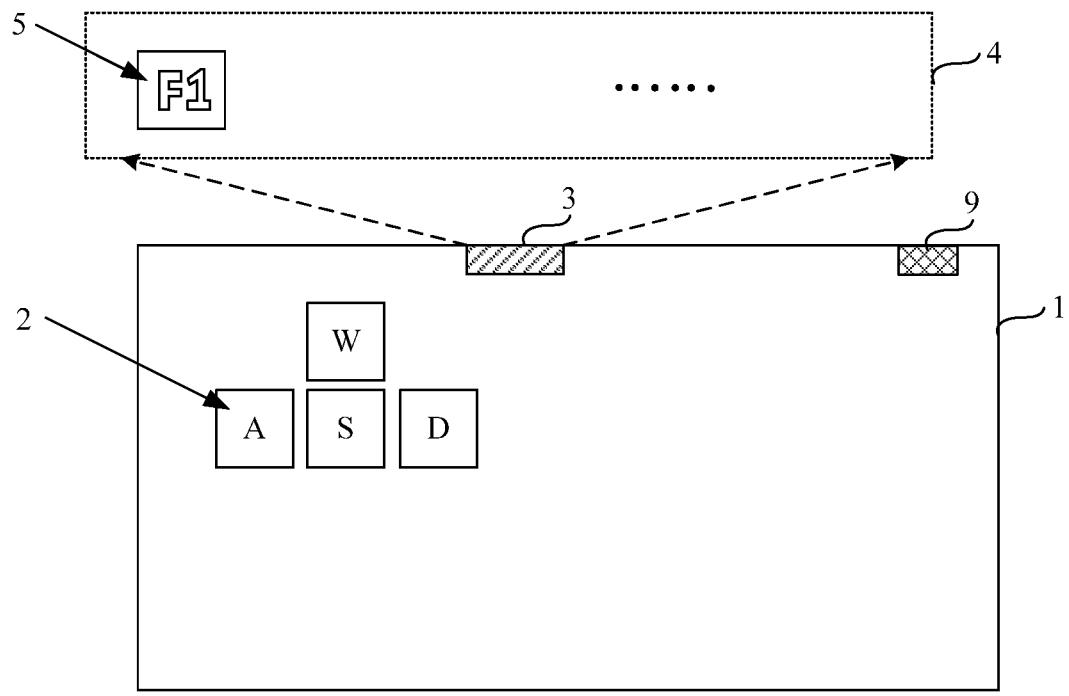
FIG. 1 is a top view of a keyboard according to an embodiment of the present disclosure.

FIG. 1 is a schematic diagram showing a structure of a keyboard according to an embodiment of the present disclosure. As shown in FIG. 1, the keyboard includes: a keyboard body 1, at least one physical key 2, at least one virtual key projection device 3, and a click detection device 9.

The physical key 2 is disposed on the keyboard body 1; the virtual key projection device 3 is connected to the keyboard body 1, and is configured to present, by means of projection, an image of at least one virtual key 5 in a projection area 4 outside an area where the keyboard body 1 is located; and the click detection device 9 is configured to detect whether a finger clicks on the projection area and determine which virtual key is clicked by the finger in response to that the finger clicks on the projection area.

In the embodiment of the present disclosure, only some keys are arranged on the keyboard body 1 in the form of physical keys 2, and the other keys are presented in the form of projected virtual keys 5. Since the keyboard body 1 has reduced number of physical keys 2 and the virtual key projection device 3 occupies a relatively small space, a size of the keyboard body 1 can be effectively reduced, that is, and in turn an overall size of the keyboard can be reduced. Meanwhile, the keys which are not presented in the form of physical key 2 may be presented in the form of virtual key 5, resulting in no loss of input functions of the keyboard.

In the embodiment of the present disclosure, some keys are arranged on the keyboard body 1 in the form of physical keys 2, therefore the keyboard provided by the present disclosure can also provide a real click experience like a conventional keyboard. The physical keys 2 may be membrane keys, or mechanical keys, etc., and the present disclosure does not limit a specific structure of the physical keys 2.

The keyboard is typically placed on a supporting surface such as a table top while being used. The projection area 4 of the keyboard may be an area of the supporting surface close to an area where the keyboard body 1 is located. The image of the virtual keys 5 projected by the virtual key projection device 3 are located within the projection area 4, and a position of the projection area 4 may be preset as required.

In some embodiments, some keys with lower frequency of use may be presented in the form of virtual keys 5, such as the keys which are located in a function key region and generally include the keys such as: F1 to F12, Ese, Print Screen, Scroll Lock, Pause/Break, and so on; and some keys with higher frequency of use may be mounted on the keyboard body 1 in the form of physical key 2, such as the keys which are located in a typing region and a numeric keypad and generally include number keys, letter keys, punctuation keys, the Space key and other control keys. It should be noted the above implementation is only an example, and does not constitute any limitation to the technical solutions of the present disclosure. In practical applications, which keys are presented in the form of physical key 2 and which keys are presented in the form of virtual key 5 may be set according to actual needs.

Figure 2:
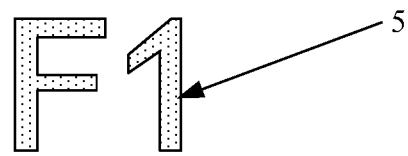
FIG. 2 is a schematic diagram showing a structure of a virtual key projection device according to an embodiment of the present disclosure.
Figure 2:
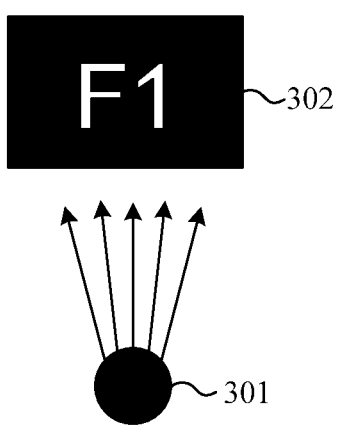

FIG. 2 is a schematic diagram showing a structure of a virtual key projection device according to an embodiment of the present disclosure. As shown in FIG. 2, in some embodiments, the virtual key projection device 3 includes: a light source 301 and an image mask 302; the image mask 302 is located on a light-emitting side of the light source 301 and is configured to have a light-transmitting region matched with the virtual key 5 to be presented and a light-shielding region in addition to the light-transmitting region. FIG. 2 only shows an exemplary example where one virtual key projection device 3 including one light source 301 and one image mask 302 projects one virtual key 5, i.e., key F1.

Figure 3:
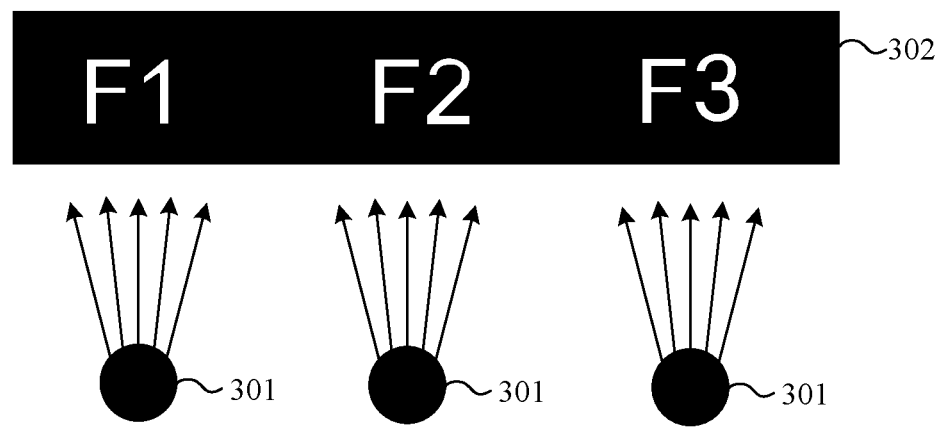
FIG. 3 is schematic diagram showing structure of a virtual key projection device according to an embodiment of the present disclosure.

FIG. 3 is a schematic diagram showing another structure of a virtual key projection device according to an embodiment of the present disclosure. As shown in FIG. 3, unlike the embodiment in FIG. 2, the virtual key projection device 3 shown in FIG. 3 includes a plurality of light sources 301, the image mask 302 is formed with a plurality of light-transmitting regions (one image mask 302 may correspond to a plurality of virtual keys 5), and each light-transmitting region corresponds to one virtual key 5. FIG. 3 only shows an embodiment where the virtual key projection device 3 projects the plurality of virtual keys 5, which are keys F1, F2, and F3, respectively.

Figure 4:
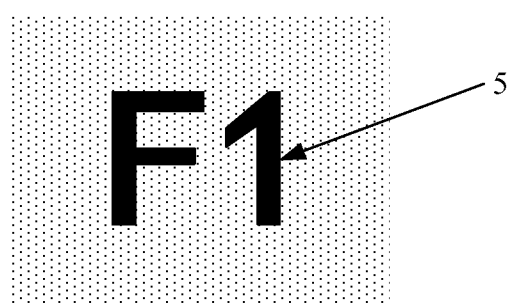
FIG. 4 is a schematic diagram showing yet structure of a virtual key projection device according to an embodiment of the present disclosure.
Figure 4:
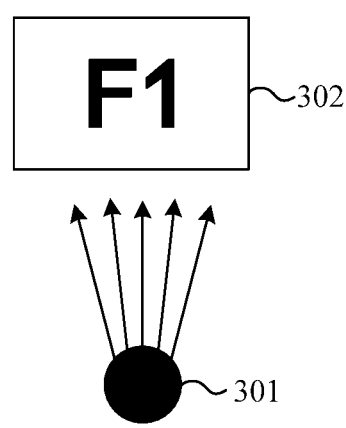

FIG. 4 is a schematic diagram showing yet another structure of a virtual key projection device according to an embodiment of the present disclosure. As shown in FIG. 4, unlike the embodiments in FIG. 2 and FIG. 3, the image mask 302 in the embodiment in FIG. 4 is configured to have a light-shielding region matched with the virtual key 5 to be presented and a light-transmitting region beyond the light-shielding region. When the image mask 302 is not disposed on the light-emitting side of the light source 301, the light source 301 may project a bright area in a certain shape (e.g., in a circle or a rectangle shape) on the projection area; and when the image mask 302 is disposed on the light-emitting side of the light source 301, the light-shielding region of the image mask may block a part of the light, thereby presenting the image (i.e., a dark area of the image) of the virtual key 5 within the bright area in the preset shape.

In the embodiments of the present disclosure, any case of matching between the light-transmitting region or the light-shielding region of the image mask 302 and the virtual key belongs to the protection scope of the present disclosure.

In practical applications, the number of the virtual key projection devices 3, and the number and specific types of the virtual keys 5 projected by each virtual key projection device 3 may be set according to actual needs. In general, the virtual keys 5 projected by various virtual key projection devices 3 do not overlap one another.

In some embodiments, a shape and a size of the light-transmitting region of the image mask 302 are adjustable (and a shape and a size of the light-shielding region of the image mask 302 are adjustable accordingly), that is, the virtual keys 5 projected by the same virtual key projection device 3 at different moments may be the same as one another or different from one another.

In some embodiments, the image mask 302 is a light-transmittance adjuster. Further, the image mask 302 includes: a liquid crystal panel. The liquid crystal panel includes a liquid crystal cell, and a first polarizer and a second polarizer respectively located on opposite sides of the liquid crystal cell. The liquid crystal cell generally includes an array substrate, a counter substrate, and a liquid crystal layer between the array substrate and the counter substrate. By controlling deflection of liquid crystal molecules in different regions of the liquid crystal cell, the light transmittance of the liquid crystal cell in the different regions may be controlled, thereby controlling a position of a light-transmitting region of the liquid crystal panel. In practical applications, the light-transmitting region of the liquid crystal panel may be adjusted and changed, and only a simple processor needs to be added and data of projection images needs to be stored.

It should be noted that in some embodiments the counter substrate in the liquid crystal cell is a color filter substrate. The virtual key 5 projected through the liquid crystal panel may have a colorful pattern, thereby realizing rich projection.

In some embodiments, the virtual key projection device 3 further includes: a collimator (not shown). The collimator is located between the light source 301 and the image mask 302 or on a side of the image mask 302 away from the light source 301, and is configured to collimate the light. A projection effect can be effectively improved with the configuration of the collimator.

Apparently, the virtual key projection device 3 provided by the embodiments of the present disclosure is not limited to the above structures, and may also be implemented in other forms. For example, the virtual key projection device 3 employs a laser projection device, a liquid crystal on silicon projection device, or a digital mirror projection device, which are small in size and convenient for integration.

It should be noted that the laser projection device, the liquid crystal on silicon projection device or the digital mirror projection device belongs to conventional devices in the prior art, so specific structures and projection principles thereof will not be described in detail here; however, the application of the laser projection device, the liquid crystal on silicon projection device or the digital mirror projection device to the keyboard to present the virtual key 5 does not belong to conventional technical means in the prior art.

In some embodiments, the virtual key projection device 3 is provided with a switch unit configured to control on and off of the virtual key projection device 3. That is, a user may control an operation state of each virtual key projection device 3 according to actual needs. For example, for some virtual keys 5 with extremely low frequency of use, the virtual key projection devices 3 corresponding to the some virtual keys 5 may be in an idle state, and may be controlled by the switch unit to be switched to an ON state only when the some virtual keys 5 need to be used, thereby effectively reducing overall power consumption of the keyboard.

Figure 5:
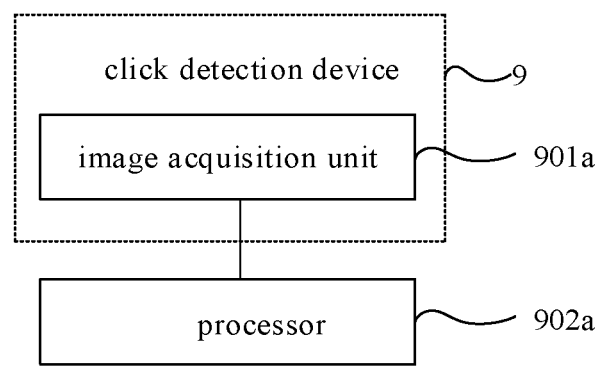
FIG. 5 is a schematic diagram showing a structure of a click detection device according to an embodiment of the present disclosure.

FIG. 5 is a schematic diagram showing a structure of a click detection device according to an embodiment of the present disclosure. As shown in FIG. 5, in some embodiments, the click detection device 9 includes: an image acquisition unit 901a. The image acquisition unit 901a is configured to continuously acquire images of the projection area 4, so that a processor 902a may identify the virtual key 5 clicked by the finger according to the images of the projection area 4 acquired by the image acquisition unit 901a. Specifically, the processor 902a may capture a contact click of the finger on a virtual key 5 in an area corresponding to the virtual key 5 based on an image processing technique.

In an example, it may be identified whether the finger is in a press-down state (i.e., to detect whether the finger performs a click operation) according to the images. When it is detected that the finger performs the click operation, image of the virtual key 5 in an area where the finger is located is extracted, so as to identify the virtual key 5 clicked by the finger. Apparently, an image processing method adopted in the embodiments of the present disclosure is not limited to the above example.

In some embodiments, a cavity is formed inside the keyboard body, and the processor 902a is disposed inside the cavity; and the image acquisition unit 901a is disposed on a surface of the keyboard body, and may perform data transmission with the processor 902a in a wired or wireless way.

Figure 6:
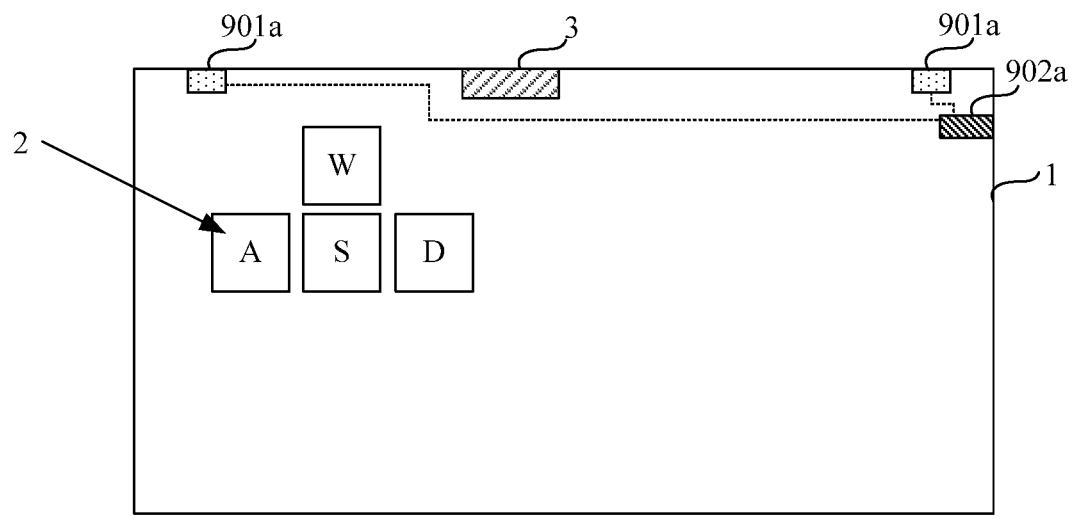
FIG. 6 is a schematic diagram showing an arrangement of two image acquisition units on a keyboard body according to an embodiment of the present disclosure.

FIG. 6 is a schematic diagram showing an arrangement of two image acquisition units on a keyboard body according to an embodiment of the present disclosure. As shown in FIG. 6, in some embodiments, two image acquisition units 901a is provided, and the two image acquisition units 901a are located at different positions on the keyboard body 1. Taking the case illustrated by FIG. 7 as an example, the two image acquisition units 901a are respectively located at two different positions (i.e., on the left side and the right sides) of the keyboard body 1. Each of the two image acquisition units 901a transmits acquired images of the projection area 4 to the processor 902a, and the processor 902a performs analyze process to obtain the information about the virtual key 5 clicked by the finger. The design of the two image acquisition units 901a may facilitate positioning of a click position of the finger and improve detection accuracy.

In some embodiments, the image acquisition unit 901a may be a structure or a device having an image acquiring function, such as a camera or an optical sensor.

Figure 7:
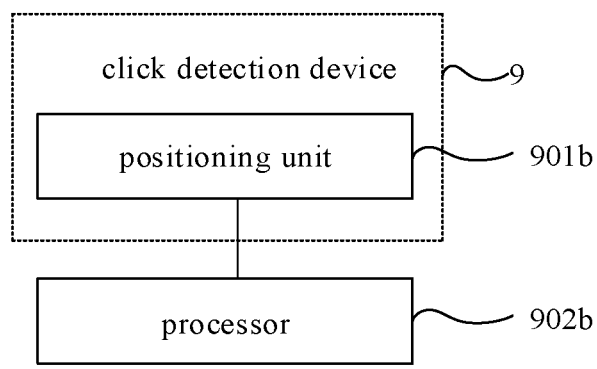
FIG. 7 is a schematic diagram showing structure of a click detection device according to an embodiment of the present disclosure.

FIG. 7 is a schematic diagram showing another structure of a lick detection device according to an embodiment of the present disclosure. As shown in FIG. 7, in some embodiments, the click detection device 9 includes: a positioning unit 901b. The positioning unit 901b is configured to acquire a click position of the finger in the projection area 4, so that the processor 902b determines the virtual key 5 on which the finger clicks according to the click position and a projected position of each virtual key 5.

Each virtual key 5 presented at any moment in the projection area 4 of the keyboard and the position of each virtual key 5 are known, so that the virtual key 5 on which the finger clicks may be determined only by determining the click position of the finger in the projection area 4.

Specifically, the positioning unit 901b in the embodiments of the present disclosure may be an optical positioning device (e.g., a laser positioning device), a radiolocation device (e.g., an acoustic positioning device or a device positioning device), etc. The technical solutions of the present disclosure do not limit a specific structure and a positioning principle of the positioning unit 901b.

It should be noted that the structures of the click detection device 9 shown in FIG. 5 and FIG. 7 are only for illustration, and do not constitute any limitation to the technical solutions of the present disclosure. Apparently, the click detection device 9 provided by the embodiments of the present disclosure may also detect and identify the virtual key 5 on which the finger clicks by adopting a click detection principle of an existing projection keyboard, which will not be described in detail here.

In some embodiments, the keyboard further includes: a prompting device (not shown) disposed on the keyboard body 1 and configured to inform a user of a successful click with a preset prompting method in response to that the click detection device 9 detects that the finger clicks on the virtual key 5.

In some embodiments, the preset prompting method includes one or more of the following methods: 1) sending out a sound prompt; 2) emitting a flicker prompt; 3) increasing display brightness of the virtual key clicked by the finger; 4) reducing brightness of other virtual keys adjacent to the virtual key clicked by the finger; and 5) sending out a vibration prompt.

Apparently, the prompting device may also be configured to inform the user of the successful click with the preset prompting method in response to that the finger clicks on the physical key 2, which may improve user experience to a certain extent.

In some embodiments, the keypad is configured to be deformable. The keyboard being "deformable" specifically means that at least part of the components of the keyboard are foldable and movable (e.g., stretchable or rotatable). A detailed description will be described below with reference to the drawings.

Figure 8:
FIG. 8 is a right view of the keyboard shown in FIG. 1.

FIG. 8 is a right view of the keyboard shown in FIG. 1. As shown in FIG. 8, in some embodiments, the keyboard is provided therein with a movable and deformable structure. Specifically, in addition to including the keyboard body 1, the physical keys 2 and the virtual key projection device 3, the keyboard further includes at least one movable supporting connector 6.

One end of the supporting connector 6 is connected to the keyboard body 1, and the other end of the supporting connector 6 is connected to at least one virtual key projection device 3. The supporting connector 6 is configured to support the virtual key projection device 3 and connect the keyboard body to the virtual key projection device 3.

In some embodiments, one end of the supporting connector 6 is connected to an edge region of the keyboard body 1. The edge region includes: a peripheral region on a surface, where the physical keys 2 are disposed, of the keyboard body 1 (as shown in FIG. 9A and FIG. 9B), and a side surface or sidewall surface of the keyboard body 1 (no shown).

In some embodiments, in a case where the movable supporting connector is disposed in the keyboard, the virtual key includes at least one of the keys F1, F2, F3, F4, F5, F6, F7, F8, F9, F10, F11 and F12.

Figure 9A:
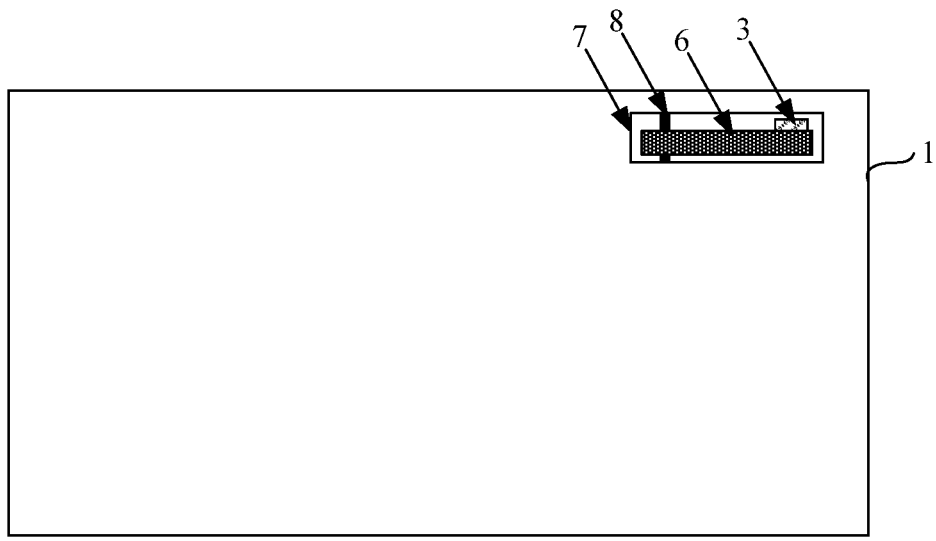
FIG. 9A is a top view showing that a supporting connector is disposed in an accommodating groove.
Figure 9B:
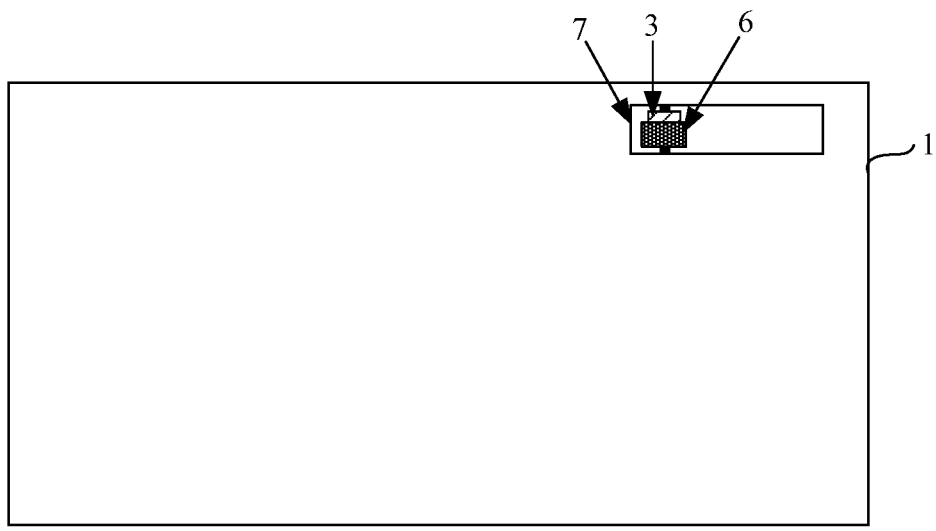
FIG. 9B is a top view showing that the supporting connector is moved out of the accommodating groove.

FIG. 9A is a top view showing that the supporting connector 6 is disposed in an accommodating groove 7, and FIG. 9B is a top view showing that the supporting connector 6 is moved out of the accommodating groove 7. As shown in FIG. 9A and FIG. 9B, in some embodiments, the accommodating groove 7 corresponding to the supporting connector 6 is formed in the edge region of the keyboard body 1, and the supporting connector 6 is capable of being placed inside the corresponding accommodating groove 7 and moved out of the corresponding accommodating groove 7.

In an implementation, as shown in FIG. 9A and FIG. 9B, a first rotating shaft 8 is disposed in the accommodating groove 7, and one end of the supporting connector 6 is connected to the first rotating shaft 8 and is capable of rotating around the first rotating shaft 8; and the supporting connector 6 may be moved out of the accommodating groove 7 or placed inside the accommodating groove 7 by rotating the first rotating shaft 8.

In another embodiment, the supporting connector 6 is connected to a slide rail and is capable of moving along the slide rail so as to slide out of or retract into the accommodating groove 7. However, the embodiment is not show.

In some embodiments, an elastic structure (not shown) and a position-limiting structure (not shown) may be provided in the accommodating groove 7, and meanwhile a mechanical button (not shown) connected to the position-limiting structure is provided outside the accommodating groove 7. When the supporting connector 6 is placed inside the accommodating groove 7, the supporting connector 6 presses the elastic structure, and the position-limiting structure prevents the supporting connector 6 from moving out of the accommodating groove 7; and when the supporting connector 6 needs to be moved out of the accommodating groove 7, the position-limiting function of the position-limiting structure is disabled by pressing the mechanical button, so that the supporting connector 6 may be moved out of the accommodating groove 7 through a rotational motion or a linear motion or by other means under the action of an elastic force from the elastic structure.

Alternatively, the supporting connector 6 may be accommodated or moved out through manual control, instead of disposing the elastic structure, the position-limiting structure and the mechanical button.

It should be noted that a position of the accommodating groove 7 in the embodiments of the present disclosure is not limited to the side of the keyboard body where the physical keys 2 are located, and the accommodating groove 7 may be disposed at other positions, such as the side surface of the keyboard body.

Figure 10:
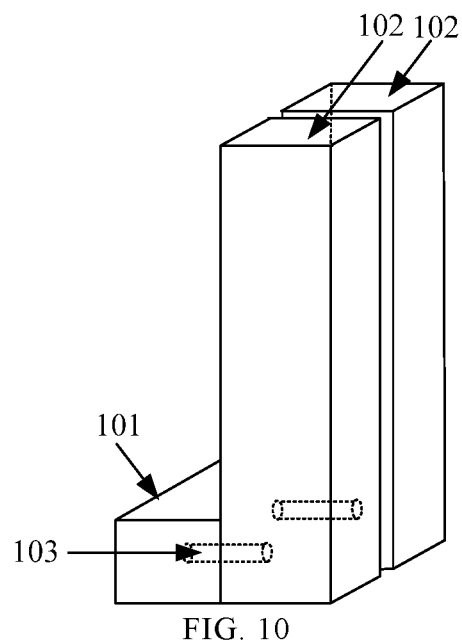
FIG. 10 is a schematic diagram showing a structure of a keyboard body according to an embodiment of the present disclosure.

FIG. 10 is a schematic diagram showing a structure of a keyboard body according to an embodiment of the present disclosure. As shown in FIG. 10, in some embodiments, the keyboard is provided therein with a foldable and deformable structure. Specifically, the keyboard body 1 is configured to be foldable and deformable, so that the keyboard occupies a less space when the keyboard is not used, and the keyboard is convenient to carry.

In some embodiments, the keyboard body 1 includes: a rotating connection portion 101 and at least one rotating portion 102. Each of the rotating portion 102 is connected to the rotating connection portion 101 through a corresponding second rotating shaft 103, and rotates around the second rotating shaft 103 to realize the folding and deformation of the keyboard body 1; and the physical keys 2 and the click detection device 9 are disposed on each of the rotating portion 102. The position where the virtual key projection device is disposed is not limited in the technical solution in FIG. 10.

In some embodiments, in a case where the keyboard body 1 includes the rotating connection portion 101 and the rotating portion 102, the physical key includes at least one of keys F1, F2, F3, F4, F5, F6 F7, F8, F9, F10, F11, and F12.

Figure 11:
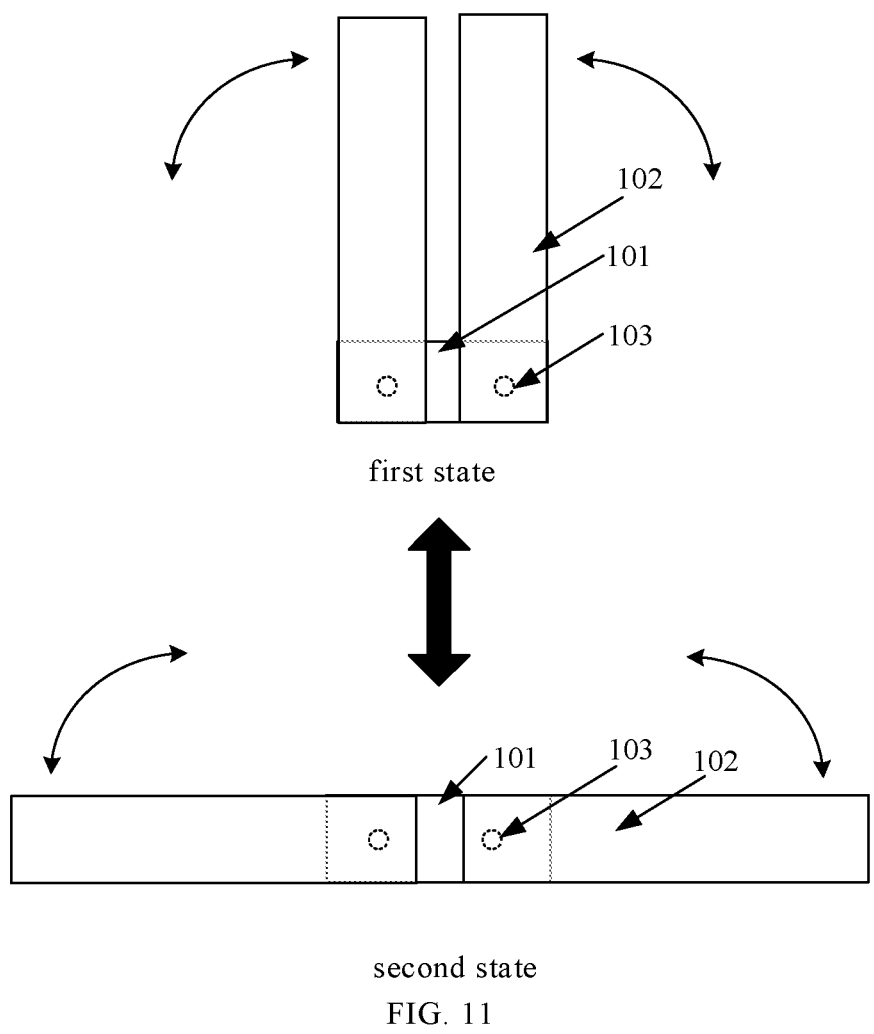
FIG. 11 is a right view showing switching of the keyboard body shown in FIG. 10 between a first state and a second state.

FIG. 11 is a right view showing switching of the keyboard body shown in FIG. 10 between a first state and a second state. As shown in FIG. 11, in an embodiment, the keyboard body includes two rotating portions 102, each of the two rotating portions 102 is in a shape of strip. The keyboard body 1 is configured to be switched between the first state and the second state. When the keyboard body 1 is in the first state, center lines of the two strip-shaped rotating portions 102 are arranged in parallel and are not collinear; and when the keyboard body 1 is in the second state, the center lines of the two strip-shaped rotating portions 102 are in the same straight line. When the keyboard is not used with the two rotating portions 102 rotated to be in a closed state (i.e., the first state) to facilitate carrying; and when the keyboard is used, with the two rotating portions 102 rotated to be in an open state (i.e., the second state) to facilitate to use.

Figure 12:
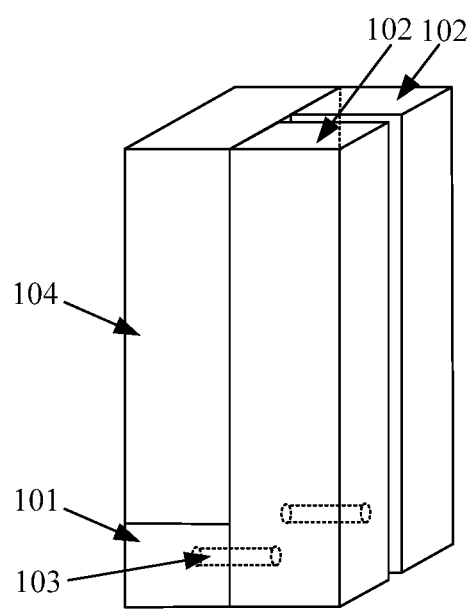
FIG. 12 is a schematic diagram showing structure of a keyboard body according to an embodiment of the present disclosure.
Figure 13:
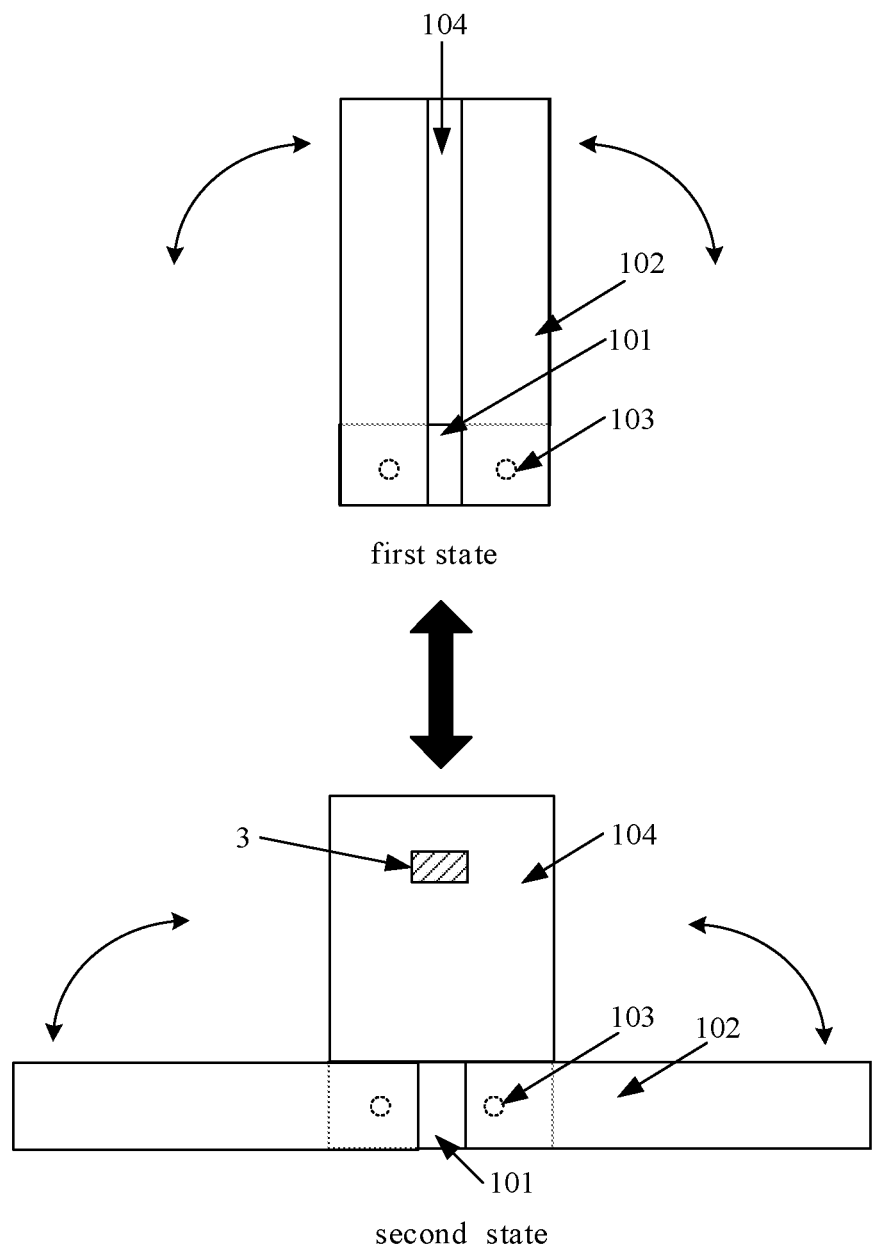
FIG. 13 is a right view showing switching of the keyboard body shown in FIG. 12 between a first state and a second state.

FIG. 12 is a schematic diagram showing another structure of a keyboard body according to an embodiment of the present disclosure, and FIG. 13 is a right view showing switching of the keyboard body shown in FIG. 12 between a first state and a second state. As shown in FIG. 12 and FIG. 13, in some embodiments, in addition to including the rotating connection portion 101 and the rotating portion 102, the keyboard body 1 further includes a carrier portion 104, one end of which is fixedly connected to the rotating connection portion 101, and the virtual key projection device 3 is disposed on the carrier portion 104.

In some embodiments, the carrier portion 104 is in a shape of strip, the keyboard body 1 include two rotating portions 102. Each of the two rotating portions 102 is in a shape of strip, and the carrier portion 104 is in a shape of strip. The keyboard body 1 is configured to be switched between the first state and the second state. When the keyboard body 1 is in the first state, the center lines of the two strip-shaped rotating portions 102 are arranged in parallel and are not collinear, and a center line of the carrier portion 104 and the center lines of the rotating portions 102 are arranged in parallel and are not collinear; and when the keyboard body 1 is in the second state, the center lines of the two strip-shaped rotating portions 102 are in the same straight line, and the center line of the carrier portion 104 is perpendicular to the center lines of the rotating portions 102.

It should be noted that each physical key and each virtual key projection device may be selectively disposed on the rotating portion and the carrier portion in some other embodiments; apparently, the supporting connector, the accommodating groove, the click detection device and the prompting device described in the above embodiments may also be selectively disposed on the rotating portion and the carrier portion according to actual situations. An arrangement of above structures is not limited by the present disclosure.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and these modifications and improvements are considered to fall within the scope of the present disclosure.

What is claimed is:

1. A keyboard, comprising:
    a keyboard body;
    at least one physical key on the keyboard body;
    at least one virtual key projection device connected to the keyboard body and configured to present, by means of projection, an image of at least one virtual key in a projection area outside the keyboard body;
    a click detection device configured to detect whether a finger clicks on the projection area and determine on which virtual key the finger clicks in response to that the finger clicks on the projection area; at least one supporting connector, with one end of the supporting connector connected to the keyboard body, and the other end of the supporting connector connected to the at least one virtual key projection device;
    an accommodating groove in the keyboard body and configured to accommodate the supporting connector; and
    a first rotating shaft in the accommodating groove, with one end of the supporting connector connected to the first rotating shaft and capable of rotating around the first rotating shaft, wherein the supporting connector and the virtual key projection device are moved out of the accommodating groove or are placed inside the accommodating groove by rotating the first rotating shaft.

2. The keyboard of claim 1, wherein the keyboard is a deformable keyboard.

3. The keyboard of claim 1, wherein one end of the supporting connector is connected to an edge region of the keyboard body, and the edge region comprises: a peripheral region, of a surface on which the physical key is disposed, of the keyboard body and a side surface of the keyboard body, or
    the virtual key comprises at least one of keys F1, F2, F3, F4, F5, F6, F7, F8, F9, F10, F11, and F12.

4. The keyboard of claim 2, wherein the keyboard body comprises:
a rotating connection portion; and
at least one rotating portion, wherein each of the at least one rotating portion is connected to the rotating connection portion through a corresponding second rotating shaft and rotates around the corresponding second rotating shaft to realize folding and deformation of the keyboard ; wherein
the physical key and the click detection device are on the rotating portion.

5. The keyboard of claim 4, wherein
the at least one rotating portion comprises two rotating portions, and each of the two rotating portions is in a shape of strip,
the keyboard body is configured to be switched between a first state and a second state;
the keyboard body is in the first state, center lines of two strip-shaped rotating portions are arranged in parallel and are not collinear; and
the keyboard body is in the second state, the center lines of the two strip-shaped rotating portions are in a same straight line.

6. The keyboard of claim 4, wherein the keyboard body further comprises a carrier portion, wherein one end of the carrier portion is fixedly connected to the rotating connection portion, and the virtual key projection device is disposed on the carrier portion.

7. The keyboard of claim 6, wherein
the at least one rotating portions comprises two rotating portions, each of the two rotating portions is in a shape of strip, and the carrier portion is in a shape of strip,
the keyboard body is configured to be switched between a first state and a second state;
the keyboard body is in the first state, center lines of two strip-shaped rotating portions are in parallel and are not collinear, and a center line of the carrier portion and the center lines of the rotating portions are in parallel and are not collinear; and
the keyboard body is in the second state, the center lines of the two strip-shaped rotating portions are in a same straight line, and the center line of the carrier portion is perpendicular to the center lines of the rotating portions.

8. The keyboard of claim 4, wherein the physical key comprises at least one of keys F1, F2, F3, F4, F5, F6, F7, F8, F9, F10, F11, and F12.

9. The keyboard of claim 1, wherein the virtual key projection device comprises:
a light source; and
an image mask on a light-emitting side of the light source; wherein the image mask has a light-transmitting region matched with the virtual key to be presented and a light-shielding region in addition to the light-transmitting region; or the image mask has a light-shielding region matched with the virtual key to be presented and a light-transmitting region in addition to the light-shielding region.

10. The keyboard of claim 9, wherein the light-transmitting region of the image mask is a light-transmitting region having an adjustable shape and/or an adjustable size or
the virtual key projection device further comprises: a collimator between the light source and the image mask or on a side of the image mask away from the light source and configured to collimate light.

11. The keyboard of claim 10, wherein the image mask comprises: a liquid crystal panel.

12. The keyboard of claim 1, wherein the virtual key projection device comprises: a laser projection device, a liquid crystal on silicon projection device, or a digital mirror projection device, or
the virtual key projection device comprises a switch unit configured to control on and off of the virtual key projection device.

13. The keyboard of claim 1, wherein the click detection device comprises:
at least one image acquisition unit configured to continuously acquire images of the projection area, so that a processor identifies the virtual key on which the finger clicks according to the images of the projection area acquired by the image acquisition unit.

14. The keyboard of claim 13, wherein the at least one image acquisition unit comprises two image acquisition units respectively located at different positions on the keyboard body.

15. The keyboard of claim 1, wherein the click detection device comprises:
a positioning unit configured to acquire a click position of the finger in the projection area, so that a processor determines the virtual key on which the finger clicks according to the click position and a projected position of each virtual key.

16. The keyboard of claim 1, further comprising:
a prompting device on the keyboard body and configured to inform a user of a successful click with a preset prompting method in response to the click detection device detects that the finger clicks on the virtual key.

17. The keyboard of claim 16, wherein the preset prompting method comprises one or more of sending out a sound prompt, emitting a flicker prompt, increasing display brightness of the clicked virtual key, reducing brightness of other virtual keys adjacent to the clicked virtual key, and sending out a vibration prompt.

* * * * *